United States Patent
Wilhelmsson et al.

(10) Patent No.: US 9,094,887 B2
(45) Date of Patent: Jul. 28, 2015

(54) METHODS AND ARRANGEMENTS FOR HANDOVER DURING DEVICE-TO-DEVICE COMMUNICATION

(71) Applicant: Telefonaktiebolaget L M Ericsson (Publ), Stockholm (SE)

(72) Inventors: Leif Wilhelmsson, Dalby (SE); Bengt Lindoff, Bjärred (SE); Anders Wallén, Ystad (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 14/044,552

(22) Filed: Oct. 2, 2013

(65) Prior Publication Data

US 2014/0099958 A1 Apr. 10, 2014

Related U.S. Application Data

(60) Provisional application No. 61/711,794, filed on Oct. 10, 2012.

(30) Foreign Application Priority Data

Oct. 5, 2012 (EP) ..................................... 12187465

(51) Int. Cl.
*H04W 36/00* (2009.01)
*H04W 36/30* (2009.01)
*H04W 36/06* (2009.01)
*H04W 76/04* (2009.01)

(52) U.S. Cl.
CPC .......... *H04W 36/30* (2013.01); *H04W 36/0055* (2013.01); *H04W 36/06* (2013.01); *H04W 76/043* (2013.01)

(58) Field of Classification Search
CPC ..... H04W 36/30; H04W 36/18; H04W 36/08; H04W 36/32; H04W 36/0083; H04W 76/02; H04W 36/0055; H04W 76/043
USPC .................................. 455/437, 436; 370/331
See application file for complete search history.

(56) References Cited

U.S. PATENT DOCUMENTS

2011/0282989 A1 11/2011 Geirhofer et al.

FOREIGN PATENT DOCUMENTS

| WO | 2011109027 A1 | 9/2011 | |
|---|---|---|---|
| WO | 2011147462 | * 12/2011 | ............ H04W 76/02 |
| WO | 2011147462 A1 | 12/2011 | |

OTHER PUBLICATIONS

Extended European Search Report dated Mar. 12, 2013 for EP Application No. 12187465.5-1857, EP Application Filing Date; Oct. 5, 2012 consisting of 8-pages.

(Continued)

*Primary Examiner* — Allahyar Kasraian
*Assistant Examiner* — B. M. M Hannan
(74) *Attorney, Agent, or Firm* — Christopher & Weisberg, P.A.

(57) ABSTRACT

A method, computer program product, arrangement and a first communication device configured to perform cellular network assisted device-to-device communication with at least a second communication device. The first communication device has a communication link to a first network node. The first or the second communication devices has a network control signal gateway function. The gateway function includes receiving downlink control signals from a respective network node, transmitting uplink control signals to the respective network node, and operating all device-to-device communication control signaling related to the first and second devices in association with the downlink and uplink control signals. A cell of a second network node is detected as a prospect target cell for handover. Assurance is obtained that the first device does not have the gateway function. Handover of a cellular communication of the first communication device from the first network node to the second network node is performed.

13 Claims, 3 Drawing Sheets

(56) References Cited

OTHER PUBLICATIONS

Gabor_Fodor_et_al., "Design Aspects of Network Assisted Device-to-Device Communications", IEEE Communications Magazine, IEEE Service Center, Piscataway, US, vol. 50(3) Mar. 1, 2012, XP011429640, ISSN: 0163-6804, DOI: 10.1109/MCOM.2012. 6163598 *abstract*, pp. 170-177, consisting of 8-pages.

* cited by examiner

METHODS AND ARRANGEMENTS FOR HANDOVER DURING DEVICE-TO-DEVICE COMMUNICATION

CROSS-REFERENCE TO RELATED APPLICATION

This application is related to and claims priority to EP Serial No. 12187465.5-1857, filed Oct. 5, 2012, entitled "METHODS AND ARRANGEMENTS FOR HANDOVER DURING DEVICE-TO-DEVICE COMMUNICATION" and U.S. Provisional Application Ser. No. 61/711,794, filed Oct. 10, 2012, the entirety of which both are incorporated herein by reference.

TECHNICAL FIELD

The present invention relates generally to the field of cellular network assisted device-to-device communication. More particularly, it relates to cell handover of cellular and/or device-to-device communication of device-to-device communication enabled devices.

BACKGROUND

Device-to-Device (D2D) communication refers to direct communication between devices. In D2D communication, data to be transmitted from a first device to a second device is not relayed via any cellular network node. Some examples of D2D communication of the prior art is used in standards like Bluetooth, and WLAN (e.g. IEEE 802.11).

Device-to-device communication may be applicable in various scenarios. One scenario is when a cellular radio access network is present, and able to set up a cellular connection between two devices. D2D communication may be a complement to the cellular communication in such scenarios.

There may be situations when D2D communication provides better performance (better signal quality, higher bit rate, lower latency, etc.) than cellular communication. This may be due to proximity between the devices and/or specific signaling gain of the D2D protocol.

In some situations, the network may have constraints (e.g. due to being heavily loaded) resulting in that a service cannot be provided at all using a network connection. Then, D2D communication would be an alternative.

There may also be situations when D2D communication is preferred by the user of a device (e.g. due to billing costs).

D2D communication may improve spectrum efficiency and reduce the network load for the cellular network, since the D2D connection typically, but not necessarily, uses another spectrum range (e.g. an unlicensed spectrum) than the cellular network (typically licensed spectrum). Furthermore, since cellular communication uses an uplink-downlink pair for each of the two devices while a D2D connection would only use one link pair, spectrum efficiency is improved even if the D2D connection would use cellular spectrum resources. This is also true for network assisted D2D communication, where most of the data is transmitted over the D2D connection and only a small amount of information is transmitted over the network links.

D2D communication may be ad hoc or may be network assisted. For example, a cellular network may assist a D2D connection by establishing security of the D2D link(s) and/or partly or fully controlling the setup of the D2D connection(s) (e.g. device/peer discovery and resource allocation). A cellular network may also assist D2D communication by controlling the interference environment. For example, if using licensed operator's spectrum for the D2D communication, higher reliability can be provided than when operating in unlicensed spectrum. To assist the D2D connection, the network may also provide synchronization and/or partial or full Radio Resource Management (RRM). RRM may e.g. comprise time and/or frequency resource allocation for the D2D communication.

Mobility management becomes more complicated in scenarios with D2D communication. For example, handover of the cellular communication related to a device that moves from one cell coverage area to another cell coverage area typically needs to consider how to handle network assisted D2D communication that the device is involved in.

Traditionally, both devices involved in a D2D link are handed over jointly, thereby also handing over the control of the D2D communication; see, for example, WO 2011/109027 A1.

A problem with this approach is that it is complicated and typically requires introduction of network signaling to handle the joint handover. There is a risk that the network control of the D2D communication is lost during the handover. Furthermore, if one of the devices need to do the handover to not lose its cellular communication link while the other device will lose its cellular communication link if it does the handover (i.e. if the two devices are in different cell areas and not in an overlapping cell region), the joint handover approach may be fatal.

Thus, there is a need for improved methods and arrangements for handover in network assisted device-to-device communication scenarios.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide improved methods and arrangements for handover in network assisted device-to-device communication scenarios.

According to a first aspect, this is achieved by a method for a first communication device adapted to perform cellular network assisted device-to-device communication with at least a second communication device, wherein the first communication device has a communication link to a first network node.

Initially, one of the first and the second communication devices has a network control signal gateway function. The gateway function comprises receiving downlink control signals from a respective network node, transmitting uplink control signals to the respective network node, and operating all device-to-device communication control signaling related to the first and second devices in association with the downlink and uplink control signals.

The method comprises detecting a cell of a second network node as a prospect target cell for handover, ensuring that the first device does not have the gateway function, and performing a handover of a cellular communication of the first communication device from the first network node to the second network node.

The second communication device may, according to some embodiments, have a communication link to either the first network node or to another network node. The another network node may or may not be the second network node.

The network nodes may be network nodes of the same or different operator networks.

In some embodiments, ensuring that the first device does not have the gateway function comprises, if the first communication device initially has the gateway function, detecting that the first communication device has the gateway function, and passing over the gateway function to the second communication device.

Passing over the gateway function may, according to some embodiments, comprise transmitting (to the second communication device) a first request to switch the gateway function from the first communication device to the second communication device, receiving (from the second communication device) a first response to the first request, wherein the response comprises an acknowledgement (ACK) or a negative acknowledgement (NACK), and passing over the gateway function to the second communication device when the first response comprises the acknowledgement.

In some embodiments, ensuring that the first device does not have the gateway function comprises, if the second communication device initially has the gateway function, detecting that the first communication device does not have the gateway function.

The method may, according to some embodiments, further comprise receiving (from the second communication device) a second request to switch the gateway function from the second communication device to the first communication device, transmitting (to the second device) a second response to the second request, wherein the response comprises an acknowledgement or a negative acknowledgement, and taking over the gateway function from the second communication device when the second response comprises the acknowledgement, thereby performing a handover of the network assisted device-to-device communication to the second network node.

A second aspect is a computer program product comprising a computer readable medium, having thereon a computer program comprising program instructions. The computer program is loadable into a data-processing unit and is adapted to cause execution of the method according to the first aspect when the computer program is run by the data-processing unit.

A third aspect provides an arrangement of a first communication device adapted to perform cellular network assisted device-to-device communication with at least a second communication device, wherein the first communication device is adapted to have a communication link to a first network node.

The arrangement comprises a detector, a determiner and a cellular handover controller. The detector is adapted to detect a cell of a second network node as a prospect target cell for handover. The determiner is adapted to ensure, in response to the detector detecting the cell of the second network node as a prospect target cell for handover, that the first device does not have a network control signal gateway function. The cellular handover controller is adapted to perform, after the determiner has ensured that the first device does not have the network control signal gateway function, a handover of a cellular communication of the first communication device from the first network node to the second network node.

The gateway function comprises receiving downlink control signals from a respective network node, transmitting uplink control signals to the respective network node, and operating all device-to-device communication control signaling related to the first and second devices in association with the downlink and uplink control signals.

In some embodiments, the determiner may be adapted to detect whether or not the first device has the gateway function. The detection may be performed as a part of ensuring that the first device does not have the network control signal gateway function.

The arrangement may, according to some embodiments, further comprise a gateway function controller adapted to pass over of the gateway function to the second communication device if the determiner detects that the first communication device has the gateway function.

In some embodiments, the arrangement may further comprise a transmitter adapted to transmit (to the second communication device) a first request to switch the gateway function from the first communication device to the second communication device, and a receiver adapted to receive (from the second communication device) a first response to the first request, wherein the response comprises an acknowledgement or a negative acknowledgement. These operations may be performed as a part of passing over of the gateway function to the second communication device.

According to some embodiments, the receiver may be further adapted to receive (from the second communication device) a second request to switch the gateway function from the second communication device to the first communication device and the transmitter may be further adapted to transmit (to the second device) a second response to the second request, wherein the response comprises an acknowledgement or a negative acknowledgement. The gateway function controller may be further adapted to take over the gateway function from the second communication device when the second response comprises the acknowledgement.

A fourth aspect is a communication device comprising the arrangement according to the third aspect.

In some embodiments, the third and fourth aspects may additionally have features identical with or corresponding to any of the various features as explained above for the first aspect.

An advantage of some embodiments is that a smooth, efficient and straight forward handover procedure is provided. Handover of the cellular communication as well as of the network control of the D2D communication (where applicable) may be accomplished according to some embodiments.

Another advantage of some embodiments is that the risk of losing the network control of the D2D communication during handover of cellular communication is decreased.

Yet an advantage of some embodiments is that the amount of network signaling is kept to a minimum. In particular, there is no need for particular signaling between the involved network nodes to handle (e.g. joint) handover of the network control of the D2D communication. Network signaling that may be required according to some embodiments comprises cellular handover signaling (between the involved device, the network node it is leaving and the target network node) and gateway function switching signaling (which may be limited to not involve signaling between network nodes).

A further advantage of some embodiments is that handover between unsynchronized network nodes is possible as well as handover between network nodes of different operator networks.

Yet a further advantage of some embodiments is that one device involved in network assisted D2D communication may be allowed to do cellular handover even if another device involved in the network assisted D2D communication cannot perform cellular handover to the same target cell.

Thus, one advantage of some embodiments is that the handover procedure is more robust with regard to the cellular communication as well as to the network control of the D2D communication.

BRIEF DESCRIPTION OF THE DRAWINGS

Further objects, features and advantages will appear from the following detailed description of embodiments, with reference being made to the accompanying drawings, in which.

DETAILED DESCRIPTION OF THE INVENTION

Figure 1:
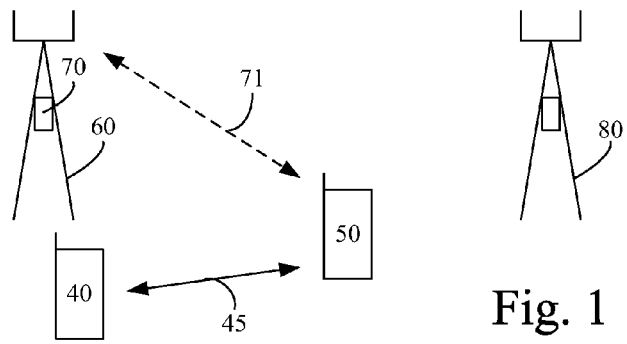
FIG. 1 is a schematic drawing of a network assisted D2D communication scenario according to some embodiments.

In the following, embodiments will be described where one or more devices involved in network assisted D2D communication may perform a handover to a new cell. The cellular network assisted device-to-device (D2D) communication is implemented by use of a master-slave concept. The master will also be referred to as a network control signal gateway or as having a master role or a network control signal gateway function (or gateway function for short).

For network assisted D2D communication, the involved devices are typically under network control. Such network control may, for example, provide a controlled interference environment. The network control may also ensure that a D2D communication link can coexist properly e.g. with conventional cellular communication and/or with other D2D links. Thus, devices involved in D2D communication typically need to maintain, permanently or periodically reestablished, means towards the network to receive or request control messages and actions.

One way to achieve this is that the network treats the devices involved in D2D communication as separate entities, and maintains dedicated logical control channels towards each of the devices. A problem with this approach, in particular if many devices are involved in the D2D communication, is that the signaling overhead between the network and the devices gets unnecessarily large.

According to embodiments presented herein, two or more devices capable of D2D communication may be organized in a D2D communication cluster. From a control perspective and network management perspective, control signaling may be minimized if the network treats the devices belonging to a D2D cluster as one (logical) entity instead of a group of individual devices. Thus, the network may manage the D2D cluster using the same methods and procedures as it would use for controlling individual conventional devices. That is, in some embodiments an abstraction may be created that allows the composition and relations between terminals within a D2D cluster to be hidden from the network.

One way to realize such an abstraction is to enable the devices forming a cluster to be coordinated (from a control perspective) by letting at least one device within the cluster act as an anchor point towards the network (this role is also referred to as the gateway function or the master role).

In some embodiments, the terminals are not hidden from the network and the network may control the terminals individually via the master.

Thus, in a D2D cluster, at least one device will occupy (e.g. by assignment or by arbitration) a master role and the other devices in the D2D cluster will occupy a slave role. A D2D cluster may have one or more slave devices. In these embodiments, all network control of the D2D communication of the cluster (e.g. D2D link control) is communicated to the master only. Thus, the master may relay or otherwise communicate control messages from the hosting network node (and/or potentially from other sources) to the other devices of the cluster, and any D2D network control signaling reaches the slave devices via the master device. From a network perspective the network anchoring point UE is the interface towards the cluster.

This approach minimizes (or at least decreases) the signaling overhead. The slaves may or may not be connected to their respective network nodes by means of regular cellular communication.

For example, any network control related to a slave may be forwarded by the master using the D2D link. Similarly, information from the slave to the network may be relayed via the master. In some embodiments, the master may not relay messages between the other devices and the network. The master role may include the possibility to actively interpret the control messages from the network (and also from the other devices) and decide how to operate based on the interpretation. Thus, the master may relay control messages, block control messages, or design new control messages based on the received ones.

More generally, the master device may receive and transmit D2D control signaling from and to a network node of the cellular network, and may operate all control signaling within the device-to-device communication cluster.

Typically, the network control of the D2D cluster may comprise controlling the devices of the cluster individually or jointly. For example, an individual allowed transmit power may be given for each device or all devices in a cluster may be limited by the same allowed transmit power. In another example, resources for the D2D links of the cluster may be allocated individually for each device by the network, or the whole cluster may be allocated D2D resources and it may be delegated to the master to decide how to divide the allocated resources between the devices of the cluster.

Thus, a master device having the gateway function according to some embodiments may exchange network assisted D2D control signaling with a network node. The exchange may include transmission and/or reception of control messages to and from the network node. Example control signaling includes, but is not limited to, power control messages, resource allocation messages, and interference control related messages. Further, the master device may administer all D2D related control signaling within the cluster, for example as has been described above.

The approach with a master role being in charge of all control communication between the network and the D2D cluster and controlling all transmissions (e.g. control signaling) within the D2D cluster typically results in a reduction of signaling overhead between the network and the D2D cluster.

Furthermore, communication is perfectly possible even when some of the devices of the cluster are out-of-coverage of the cellular network.

As mentioned above, a D2D communication cluster may comprise two or more devices. For simplicity, the case with two devices will be used as example in the following. It should be understood, however, that a cluster could comprise more than two devices and that the principles of the embodiments are equally applicable to that case.

FIG. 1 illustrates a network assisted D2D communication scenario according to some embodiments. Two D2D communication enabled devices 40, 50 are comprised in a D2D cluster.

Within the cluster, some devices have a D2D communication link between them and some do not. Device 40 and device 50 are connected via the link 45.

The device 50 currently has the master role and the device 40 has a slave role. Thus, device 50 has a control link 71 to a network node 70 which is comprised in a network site 60.

According to some embodiments, when either of the devices 40, 50 is to do a handover (of the cellular communication) to another target cell (e.g. a cell served by network site 80), the device first ensures that it has a slave role and then performs the handover (in accordance with any suitable known or future handover procedures).

If it is the device 40 (i.e. the device that already has the slave role) that is about to do a handover, no further measures are needed before the handover is performed.

On the other hand, if it is the device 50 (i.e. the device that has the master role) that is about to do a handover, the master role is switched before the handover is performed. The master role is switched to any other suitable device within the D2D communication cluster.

Thus, a device in D2D communication ensures that it has a slave role before it performs a cellular communication handover.

As will be understood, the handover of cellular communication in combination with master role (gateway function) switch may imply that a handover of the network control of the network assisted D2D communication is also performed. Thus, the D2D control link may be handed over from one cell to another.

One example scenario when embodiments may be applicable is when devices engaged in D2D communication are moving in the same general direction, e.g. when they are on the same train, bus or highway route. However, embodiments are equally applicable to scenarios where the devices move more independently.

Figure 2:
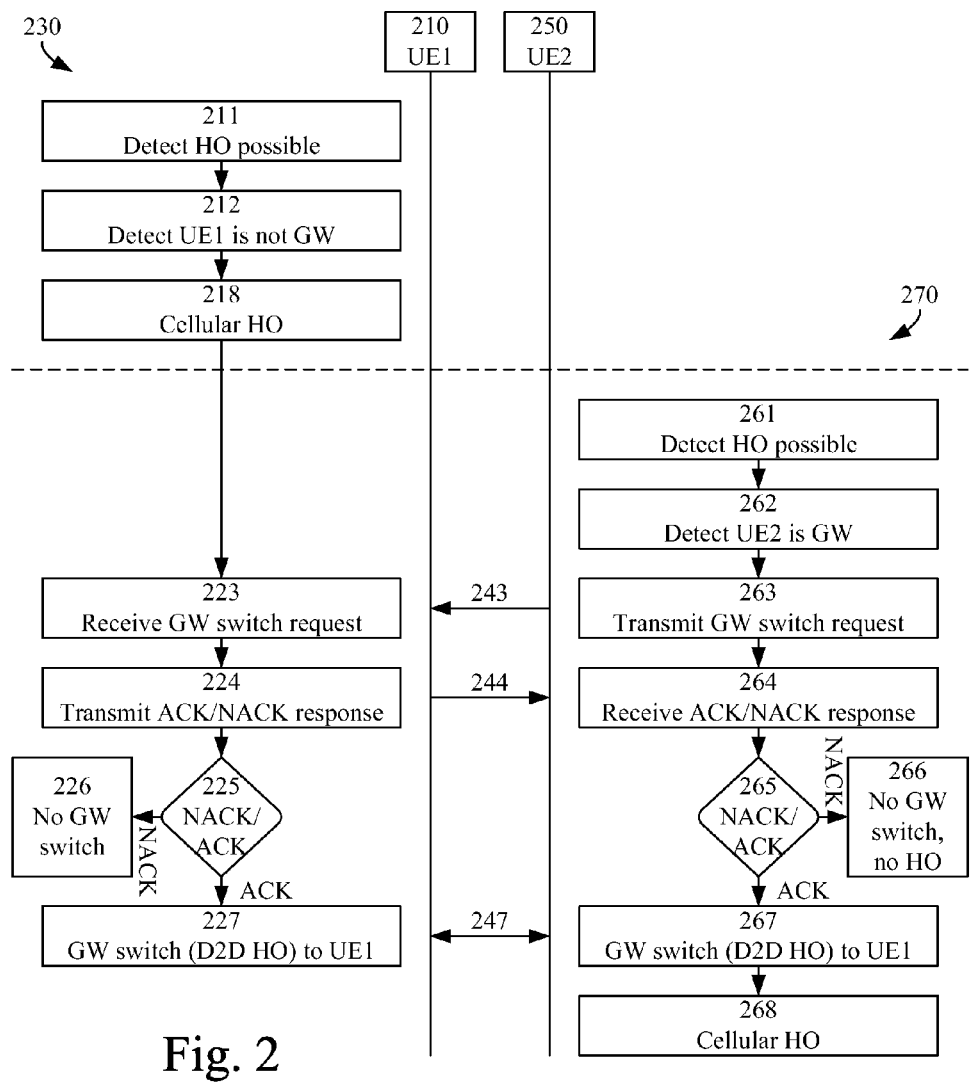
FIG. 2 is a combined flowchart and signaling diagram illustrating example method steps and signaling according to some embodiments.

FIG. 2 illustrates two example methods 230 and 270 according to some embodiments. The method 230 is performed by a device (UE1) 210 involved in D2D communication with a device (UE2) 250, which performs the method 270. Initially, UE2 has the gateway function. Thus, UE2 is master and UE1 is slave. Furthermore, UE1 and UE2 are connected to respective network nodes (which may or may not be the same network node).

The method 230 starts in 211 where it is detected that a cellular communication handover of UE1 is possible. This detection may be performed according to any suitable known of future algorithm.

In 212 of method 230, it is detected that UE1 has a slave role (and thus not a master role, gateway function).

When it is ensured that UE1 is not master, a cellular handover may take place in 218 of method 230. The handover may be performed according to any suitable known of future algorithm.

If UE2 does not subsequently detect that a cellular communication of UE2 is possible, these particular operations of UE1 and UE2 with regard to handover may be viewed as terminated.

However, if UE2 detects, in 261 of method 270, that a cellular communication handover of UE2 is possible (compare with 211), the method 270 continues to 262 where it is detected that UE2 has a master role. Thus, before UE2 may perform the handover UE2 preferably needs to hand over the master role to another device, e.g. UE1.

In 263 of method 270 UE2 sends a gateway function switch request 243 to UE1, which request is received by UE1 in 223 of method 230. Depending on various criteria, UE1 may accept or reject the request. Thus, in 224 of method 230, UE1 sends a gateway function switch response 244, which response is received by UE2 in 264 of method 270. The response may comprise an acknowledgement (ACK) or a negative acknowledgement (NACK) depending on if UE1 accepted or rejected the request.

If the response comprised a negative acknowledgement (NACK-path out from 225 of method 230 and NACK-path out from 265 of method 270), there is no gateway function switch between UE1 and UE2 as illustrated by 226 of method 230 and by 266 of method 270. If there are more devices in the cluster, UE2 may try to switch the gateway function to another device. If no gateway function switch is performed, UE2 does not perform any cellular communication handover as is also illustrated by 266 of method 270.

If the response comprised an acknowledgement (ACK-path out from 225 of method 230 and ACK-path out from 265 of method 270), a gateway function switch is performed between UE2 and UE1 in 227 of method 230 and in 267 of method 270, as is illustrated by the mutual signaling 247. If UE1 and UE2 are connected to different network nodes at this point in time, the gateway function switch also implies a handover of the network control link of the D2D communication.

Example gateway function switch procedures will be given with reference to both FIG. 2 and FIG. 3.

When it is ensured that UE2 does not have the master role, a cellular handover may take place in 268 of method 270 (compare with 218). Thus, assuming the case when UE1 and UE2 are first connected to a first network node (eNB1) and performs respective handover to a second network node eNB2, the D2D link is moved from being under control of eNB1 to being under control under eNB2 when UE1 has become a master eNB2 in 227. When the gateway function switch is completed, the D2D communication control handover from eNB1 to eNB2 is also completed. Thus, UE2 no longer need to have a master role connected to eNB1 and a handover of UE2 to eNB2 may be performed.

Figure 3:
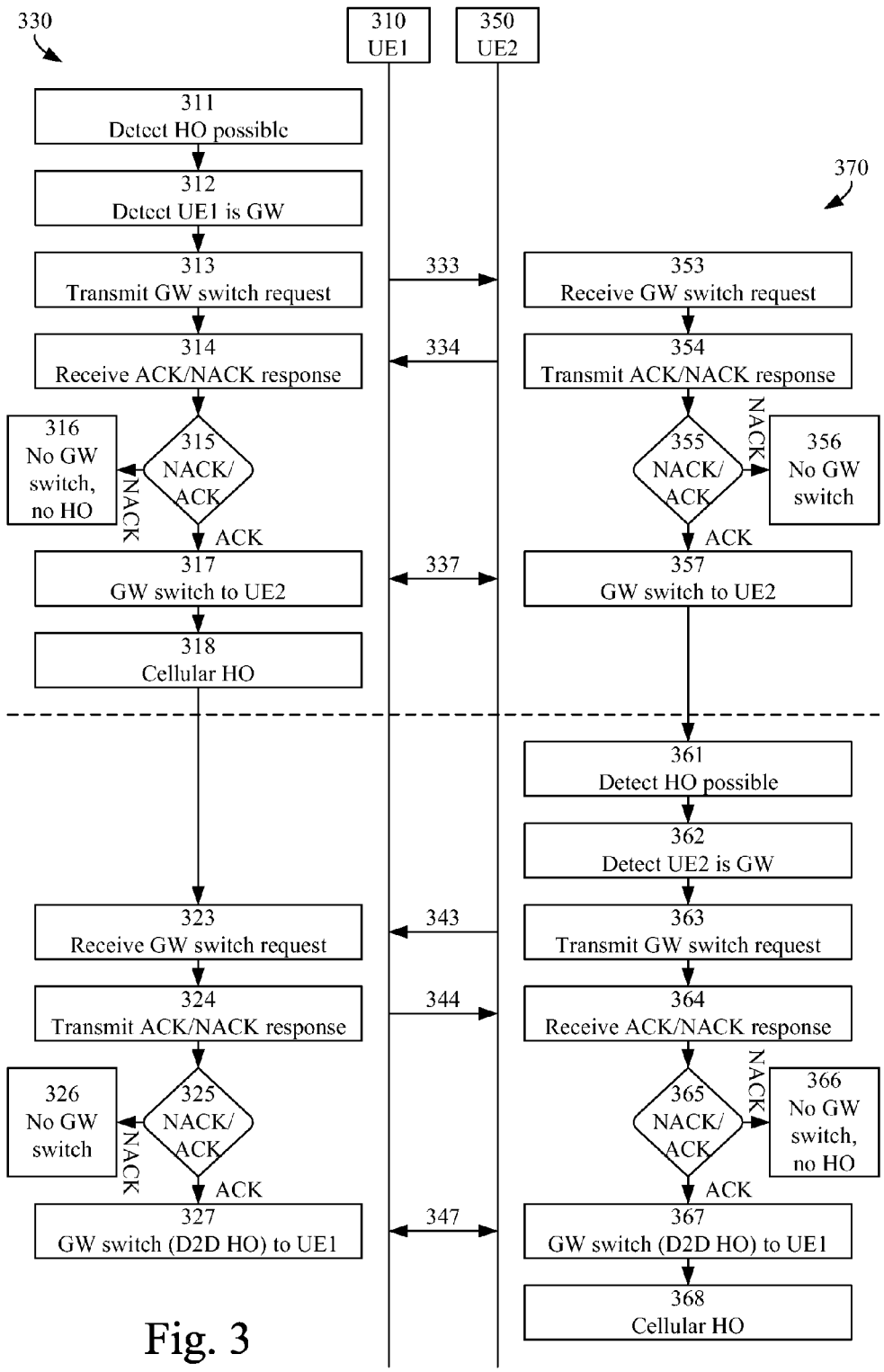
FIG. 3 is a combined flowchart and signaling diagram illustrating example method steps and signaling according to some embodiments.

FIG. 3 illustrates two example methods 330 and 370 according to some embodiments. The method 330 is performed by a device (UE1) 310 involved in D2D communication with a device (UE2) 350, which performs the method 370. Initially, UE1 has the gateway function. Thus, UE1 has the master role and UE2 has the slave role. Furthermore, UE1 and UE2 are connected to respective network nodes (which may or may not be the same network node).

The method 330 starts in 311 where it is detected that a cellular communication handover of UE1 is possible (compare with 211 of FIG. 2).

In 312 of method 330, it is detected that UE1 has a master role. Thus, before UE1 may perform the handover, UE1 preferably needs to hand over the master role to another device, e.g. UE2.

In 313 of method 330 UE1 sends a gateway function switch request 333 to UE2, and the request is received by UE2 in 353 of method 370. In 354 of method 370, UE2 sends a gateway function switch response 334, and the response is received by UE1 in 314 of method 330. The response may comprise an acknowledgement (ACK) or a negative acknowledgement (NACK) depending on if UE2 accepted or rejected the request.

If the response comprised a negative acknowledgement (NACK-path out from 355 of method 370 and NACK-path out from 315 of method 330), there is no gateway function switch between UE1 and UE2 as illustrated by 356 of method 370 and by 316 of method 330. If there are more devices in the cluster, UE1 may try to switch the gateway function to another device. If no gateway function switch is performed, UE1 does not perform any cellular communication handover as is also illustrated by 316 of method 330.

If the response comprised an acknowledgement (ACK-path out from 355 of method 370 and ACK-path out from 315 of method 330), a gateway function switch is performed between UE2 and UE1 in 357 of method 370 and in 317 of method 330, as is illustrated by the mutual signaling 337. If UE1 and UE2 are connected to different network nodes at this point in time, the gateway function switch also implies a handover of the network control link of the D2D communication.

When it is ensured that UE1 is not master, a cellular handover may take place in 318 of method 330 (compare with 218 of FIG. 2).

If UE2 does not subsequently detect that a cellular communication of UE2 is possible, these particular operations of UE1 and UE2 with regard to handover may be viewed as terminated.

However, if UE2 detects, in 361 of method 370, that a cellular communication handover of UE2 is possible (compare with 311), the method 370 continues to 362 where it is detected that UE2 has a master role. Thus, before UE2 may perform the handover UE2 preferably needs to hand over the master role to another device, e.g. UE1.

In 363 of method 370 UE2 sends a gateway function switch request 343 to UE1, which request is received by UE1 in 323 of method 330. In 324 of method 330, UE1 sends a gateway function switch response 344, which response is received by UE2 in 364 of method 370. The response may comprise an acknowledgement (ACK) or a negative acknowledgement (NACK) depending on if UE1 accepted or rejected the request.

If the response comprised a negative acknowledgement (NACK-path out from 325 of method 330 and NACK-path out from 365 of method 370), there is no gateway function switch between UE1 and UE2 as illustrated by 326 of method 330 and by 366 of method 370. If there are more devices in the cluster, UE2 may try to switch the gateway function to another device. If no gateway function switch is performed, UE2 does not perform any cellular communication handover as is also illustrated by 366 of method 370.

If the response comprised an acknowledgement (ACK-path out from 325 of method 330 and ACK-path out from 365 of method 370), a gateway function switch is performed between UE2 and UE1 in 327 of method 330 and in 367 of method 370, as is illustrated by the mutual signaling 347. If UE1 and UE2 are connected to different network nodes at this point in time, the gateway function switch also implies a handover of the network control link of the D2D communication.

When it is ensured that UE2 does not have the master role, a cellular handover may take place in 368 of method 370 (compare with 318).

When a D2D cluster comprises only two devices (e.g. UE1 and UE2 of FIGS. 2 and 3), it is straight forward which device should be chosen as a prospect new master device (see e.g. 263, 313, 363 of FIGS. 2 and 3). However, when a D2D cluster comprises more than two devices various criteria may be applied for the selection of the prospect new master device as will be exemplified in the following. If the first choice prospect new master rejects the switch request, a next choice may (of course) be tried, etc.

The selection of the prospect new master device may, according to some embodiments, be based on link quality measurements of prospect communication links between the network node and the master device and between the network node and the other devices. Alternatively or additionally, the selection of the prospect new master device may be based on link quality measurements of device-to-device communication links between the master device and the other devices and between each of the other devices and the devices of the rest of the cluster. The link quality measurements may be acquired by performing link quality measurements and/or receiving link quality measurement reports from other devices.

A link quality may be measured in terms of one or more of a signal-to-noise ratio (SNR), a signal-to-interference ratio (SIR), a signal-to-noise-and-interference ratio (SNIR), a bit error rate (BER), a block error rate (BLER), a received signal strength indicator (RSSI), a reference signal received power (RSRP), a reference signal received quality (RSRQ), or similar. A link quality may also be defined in binary terms, for example, whether or not it is possible to set up the communication link or not. A link quality may also be determined based on the power level used in communication of the link.

The selection of the prospect new master device may be based on, for example, which device is best suited (among the devices of the cluster) to receive and transmit network control signaling from and to the cellular network. For example, a device may be selected as the prospect new master if its link quality measurement of the prospect communication link indicates a best quality among the link quality measurements of the prospect communication links between the network node and the communication devices.

Additionally or alternatively, the selection of the prospect new master device may be based on, for example, which device is best suited (among the devices of the cluster) to control all the devices of the D2D cluster, e.g. to receive and transmit D2D control signaling from and to the other devices. For example, a device may be selected as the prospect new master if its link quality measurement of the device-to-device communication links between the device and the other devices indicates a best quality. Alternatively or additionally, a device may be selected as the prospect new master if its link quality measurement of the device-to-device communication links between the device and the other devices indicates that the device can setup a D2D communication link to all of the D2D devices.

Combinations of the above example selection criteria are also possible, as well as introducing further criteria. For example, it may be decided to switch the gateway function to a device if the device has both a quality of the prospect network node communication link that is above a quality threshold and a possibility to connect to all of the D2D devices of the cluster. In some embodiments, the selection may comprise first determining which devices have a possibility to connect to all of the D2D devices, and then selecting—among the determined devices—the device that has the best quality of the prospect network node communication link.

A best quality may be defined as an extreme value among the link quality measurements. An extreme value may, for example, be a maximum or minimum value.

As indicated above, one or more border conditions may be applied before searching for extreme values. For example, devices that cannot have a D2D connection to all devices in the cluster may be omitted from the extreme value evaluation.

Further selection criteria, for example an operational capability of the device, may also be applied according to some embodiments. The operational capability of a device may, for example, comprise one or more of a computational power and a UE capability. The UE capability may, for example, comprise which communication bands the device is able to support. For other example factors of UE capability, please refer to $3^{rd}$ generation partnership program (3GPP) standard specifications.

As mentioned above, the prospect new master device may reject the request (see e.g. 265, 355, 365 of FIGS. 2 and 3). One situation when this may occur is if that device plans or is already involved in a cellular communication handover procedure. Another example situation when a device may reject the request to take over the master role is when it does not have the available computational power for this operation or when it would cause an unacceptable increase in power consumption. An example relating to the latter case is when the prospect new master device is only engaged in very small amounts of D2D traffic (e.g. one transmission per minute on average). If such a device would take over the master role it would typically have to increase its D2D activity significantly (e.g. to being active once every 100 ms). This would cause an unacceptable increase in power consumption, and the device may therefore choose to reject the request.

An example procedure that may be applied to accomplish the gateway function (i.e. master) switch will now be described.

When it has been decided to switch the master role to another device, the master device sends a switch instruction to the other device. The other device may reject or accept this switch instruction in a response message as has already been described in connection to FIGS. 2 and 3.

If the response is an ACK (see e.g. 227, 267, 317, 357, 327, 367 of FIGS. 2 and 3), the master device sends a master change request to the network. The network sends a response to the master change request, which response is received by the master. The response can be either an acknowledgement (ACK) or a negative acknowledgement (NACK). If the response is a NACK, the master switch is aborted and the other device may be informed thereof by the master device. If the response is an ACK, the master device forwards the ACK to the device that is to take over the master role.

The prospect new master device takes over the master role and informs the network thereof. The new master device also informs (e.g. by broadcast) the devices of the cluster that it is the new master. When the old master device gets this broadcast (or other confirmation that the master role is taken over), it releases the master role.

Figure 4:
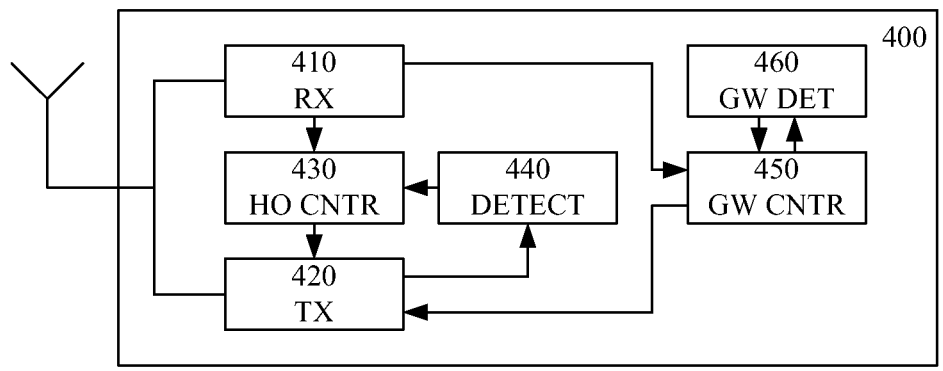
FIG. 4 is a block diagram illustrating an example arrangement according to some embodiments.

FIG. 4 is a block diagram illustrating an example arrangement 400 according to some embodiments. The arrangement 400 may, for example, be adapted to perform any of the methods as described in connection to FIGS. 2 and 3.

The arrangement comprises a receiver (RX) 410 and a transmitter (TX) 420 adapted to receive and transmit signals (e.g. control messages, reports, requests, instructions, responses, etc.) as described herein.

The arrangement further comprises a detector (DETECT) 440 adapted to detect prospect target cells for handover and a cellular handover controller (HO CNTR) 430 adapted to perform cellular communication handover to the target cell, provided that the device comprising the arrangement does not have a master role.

A determiner (GW DET) 460 of the arrangement is adapted to ensure, before a cellular handover is performed, that the device comprising the arrangement does not have a master role. The determiner 460 may be adapted to detect whether or not the first device has the master role.

If it is detected that the first device is not a master, the cellular handover controller 430 can perform the handover directly.

If it is detected that the first device is a master, a gateway function controller (GW CNTR) 450 of the arrangement may be adapted to pass over of the master role to another communication device using, for example, any of the selection and signaling procedures described in connection to FIGS. 2 and 3. Then, the cellular handover controller 430 can perform the handover.

The gateway function controller 450 may be further adapted to take over the master role from other devices when requested.

In some embodiments, the arrangement may also comprise a measurement unit (not shown) adapted to perform measurements of communication links as described herein. A controller (not shown) may also be provided that is adapted to operate all control signaling within a device-to-device communication cluster when a device comprising the arrangement has a master role in the cluster.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a communicator, an electronic organizer, a smartphone, a computer, a notebook, an embedded drive, or a mobile gaming device.

Figure 5:
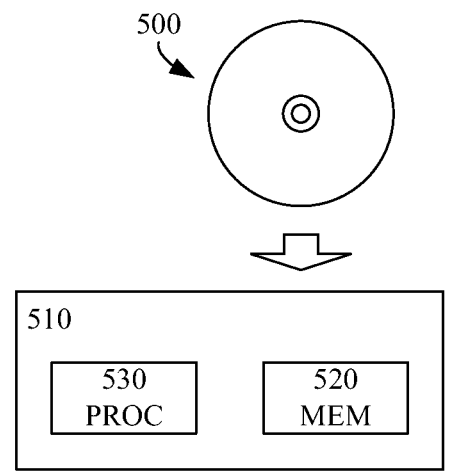
FIG. 5 is a schematic drawing illustrating a computer program product according to some embodiments.

According to some embodiments, a computer program product comprises a computer readable medium such as, for example, a diskette, a USB-stick, a plug-in card or a CD-ROM (as illustrated by 500 in FIG. 5). The computer readable medium may have stored thereon a computer program comprising program instructions. The computer program may be loadable into a data-processing unit (530), which may, for example, be comprised in a mobile terminal (510). When loaded into the data-processing unit, the computer program may be stored in a memory (520) associated with or integral to the data-processing unit. According to some embodiments, the computer program may, when loaded into and run by the data-processing unit, cause the data-processing unit to execute method steps according to, for example, the methods shown in any of the FIGS. 2 and 3.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

What is claimed is:

1. A method for a first communication device configured to perform cellular network assisted device-to-device communication with at least a second communication device, the first communication device having a communication link to a first network node and one of the first and the second communication devices initially has a network control signal gateway function, said gateway function comprising receiving downlink control signals from a respective network node, transmitting uplink control signals to the respective network node, and operating all device-to-device communication control signaling related to the first and second communication devices in association with the downlink and uplink control signals, the method comprising:
    detecting a cell of a second network node as a prospect target cell for handover;
    detecting whether the first communication device has the gateway function;
    if the detection is made that the first communication device has the gateway function, passing over the gateway function to the second communication device before handover is performed; and
    performing a handover of a cellular communication of the first communication device from the first network node to the second network node.

2. The method of claim 1, further comprising:
    receiving, from the second communication device, a second request to switch the gateway function from the second communication device to the first communication device;
    transmitting, to the second device, a second response to the second request, wherein the response comprises an acknowledgement or a negative acknowledgement; and
    taking over the gateway function from the second communication device when the second response comprises the acknowledgement, thereby performing a handover of the network assisted device-to-device communication to the second network node.

3. The method of claim 1, wherein passing over the gateway function comprises:
    transmitting, to the second communication device, a first request to switch the gateway function from the first communication device to the second communication device;
    receiving, from the second communication device, a first response to the first request, wherein the response comprises one of an acknowledgement and a negative acknowledgement; and
    passing over the gateway function to the second communication device when the first response comprises the acknowledgement.

4. The method of claim 3, further comprising:
    receiving, from the second communication device, a second request to switch the gateway function from the second communication device to the first communication device;
    transmitting, to the second device, a second response to the second request, wherein the response comprises one of an acknowledgement and a negative acknowledgement; and
    taking over the gateway function from the second communication device when the second response comprises the acknowledgement, thereby performing a handover of the network assisted device-to-device communication to the second network node.

5. The method of claim 1, further comprising:
    receiving, from the second communication device, a second request to switch the gateway function from the second communication device to the first communication device;
    transmitting, to the second device, a second response to the second request, wherein the response comprises one of an acknowledgement and a negative acknowledgement; and
    taking over the gateway function from the second communication device when the second response comprises the acknowledgement, thereby performing a handover of the network assisted device-to-device communication to the second network node.

6. A computer program product comprising a non-transitory computer readable medium, having thereon a computer program comprising program instructions that, when executed by a processor, performs a method for a first communication device configured to perform cellular network assisted device-to-device communication with at least a second communication device, the first communication device having a communication link to a first network node and one of the first and the second communication devices initially has a network control signal gateway function, said gateway function comprising receiving downlink control signals from a respective network node, transmitting uplink control signals to the respective network node, and operating all device-to-device communication control signaling related to the first and second communication devices in association with the downlink and uplink control signals, the method comprising:
    detecting a cell of a second network node as a prospect target cell for handover;
    detecting whether the first communication device has the gateway function;
    if the detection is made that the first device has the gateway function, passing over the gateway function to the second communication device before handover is performed; and
    performing a handover of a cellular communication of the first communication device from the first network node to the second network node.

7. The computer program product of claim 6, wherein the method performed by the program instructions when executed by the processor further comprises:
    receiving, from the second communication device, a second request to switch the gateway function from the second communication device to the first communication device;
    transmitting, to the second device, a second response to the second request, wherein the response comprises one of an acknowledgement and a negative acknowledgement; and taking over the gateway function from the second communication device when the second response comprises the acknowledgement, thereby performing a handover of the network assisted device-to-device communication to the second network node.

8. The computer program product of claim 6, wherein passing over the gateway function comprises:
transmitting, to the second communication device, a first request to switch the gateway function from the first communication device to the second communication device;
receiving, from the second communication device, a first response to the first request, wherein the response comprises one of an acknowledgement and a negative acknowledgement; and
passing over the gateway function to the second communication device when the first response comprises the acknowledgement.

9. An arrangement of a first communication device configured to perform cellular network assisted device-to-device communication with at least a second communication device, the first communication device being configured to have a communication link to a first network node, the arrangement comprising:
a detector configured to detect a cell of a second network node as a prospect target cell for handover;
a determiner configured to detect, in response to the detector detecting the cell of the second network node as a prospect target cell for handover, whether the first device has a network control signal gateway function, said gateway function comprising:
receiving downlink control signals from a respective network node;
transmitting uplink control signals to the respective network node; and
operating all device-to-device communication control signaling related to the first and second communication devices in association with the downlink and uplink control signals;
a gateway function controller configured to, if the determiner detects that the first communication device has the gateway function, pass over the gateway function to the second communication device before the cellular handover controller performs a handover; and
a cellular handover controller configured to perform the handover of a cellular communication of the first communication device from the first network node to the second network node.

10. The arrangement of claim 9, further comprising a gateway function controller configured to pass over the gateway function to the second communication device if the determiner detects that the first communication device has the gateway function.

11. The arrangement of claim 10, further comprising:
a transmitter configured to transmit, to the second communication device, a first request to switch the gateway function from the first communication device to the second communication device; and
a receiver configured to receive, from the second communication device, a first response to the first request, wherein the response comprises one of an acknowledgement and a negative acknowledgement.

12. The arrangement of claim 11, wherein:
the receiver is further configured to receive, from the second communication device, a second request to switch the gateway function from the second communication device to the first communication device;
the transmitter is further configured to transmit, to the second device, a second response to the second request, wherein the response comprises one of an acknowledgement and a negative acknowledgement; and
the gateway function controller is further configured to take over the gateway function from the second communication device when the second response comprises the acknowledgement.

13. A first communication device configured to perform cellular network assisted device-to-device communication with at least a second communication device, the first communication device being configured to have a communication link to a first network node, the first communication device comprising:
a detector configured to detect a cell of a second network node as a prospect target cell for handover;
a determiner configured to detect, in response to the detector detecting the cell of the second network node as a prospect target cell for handover, whether the first communication device does not have a network control signal gateway function, said gateway function comprising:
receiving downlink control signals from a respective network node;
transmitting uplink control signals to the respective network node; and
operating all device-to-device communication control signaling related to the device and the second communication device in association with the downlink and uplink control signals;
a gateway function controller configured to, if the determiner detects that the first communication device has the gateway function, pass over the gateway function to the second communication device before the cellular handover controller performs a handover; and
a cellular handover controller configured to perform the handover of a cellular communication of the first communication device from the first network node to the second network node.

* * * * *